(12) United States Patent
Stange et al.

(10) Patent No.: US 8,260,492 B2
(45) Date of Patent: Sep. 4, 2012

(54) METHOD AND SYSTEM FOR REDUNDANCY MANAGEMENT OF DISTRIBUTED AND RECOVERABLE DIGITAL CONTROL SYSTEM

(75) Inventors: Kent Stange, Phoenix, AZ (US);
Richard Hess, Glendale, AZ (US);
Gerald B Kelley, Glendale, AZ (US);
Randy Rogers, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1201 days.

(21) Appl. No.: 11/381,652

(22) Filed: May 4, 2006

(65) Prior Publication Data
US 2007/0033435 A1 Feb. 8, 2007

Related U.S. Application Data

(60) Provisional application No. 60/705,843, filed on Aug. 5, 2005.

(51) Int. Cl.
*G06F 11/08* (2006.01)
*G06F 11/20* (2006.01)
(52) U.S. Cl. .......... 701/34.3; 701/33.7; 714/15; 714/20; 714/E11.007; 714/E11.03; 714/E11.055
(58) Field of Classification Search .................. 714/15
See application file for complete search history.

(56) References Cited

U.S. PATENT DOCUMENTS

| | | | |
|---|---|---|---|
| 4,345,327 A | 8/1982 | Thuy | |
| 4,453,215 A | 6/1984 | Reid | |
| 4,751,670 A | 6/1988 | Hess | |
| 4,996,687 A * | 2/1991 | Hess et al. | 714/15 |
| 5,086,429 A | 2/1992 | Gray et al. | |
| 5,313,625 A * | 5/1994 | Hess et al. | 714/10 |
| 5,440,726 A * | 8/1995 | Fuchs et al. | 714/20 |

(Continued)

FOREIGN PATENT DOCUMENTS

EP 0363863 4/1990

(Continued)

OTHER PUBLICATIONS

Lee, "Design and Evaluation of a Fault-Tolerant Multiprocessor using Hardware Recovery Blocks", Aug. 1982, pp. 1-19, Publisher: University of Michigan Computing Research Laboratory, Published in: Ann Arbor, MI.

(Continued)

Primary Examiner — Shelley Chen
(74) Attorney, Agent, or Firm — Fogg & Powers LLC

(57) ABSTRACT

A method and system for redundancy management is provided for a distributed and recoverable digital control system. The method uses unique redundancy management techniques to achieve recovery and restoration of redundant elements to full operation in an asynchronous environment. The system includes a first computing unit comprising a pair of redundant computational lanes for generating redundant control commands. One or more internal monitors detect data errors in the control commands, and provide a recovery trigger to the first computing unit. A second redundant computing unit provides the same features as the first computing unit. A first actuator control unit is configured to provide blending and monitoring of the control commands from the first and second computing units, and to provide a recovery trigger to each of the first and second computing units. A second actuator control unit provides the same features as the first actuator control unit.

18 Claims, 4 Drawing Sheets

U.S. PATENT DOCUMENTS

| | | | |
|---|---|---|---|
| 5,530,802 A * | 6/1996 | Fuchs et al. | 714/17 |
| 5,550,736 A | 8/1996 | Hay et al. | |
| 5,553,239 A * | 9/1996 | Heath et al. | 726/2 |
| 5,590,277 A * | 12/1996 | Fuchs et al. | 714/38.13 |
| 5,732,074 A | 3/1998 | Spaur et al. | |
| 5,757,641 A | 5/1998 | Minto | |
| 5,903,717 A | 5/1999 | Wardrop | |
| 5,909,541 A | 6/1999 | Sampson et al. | |
| 5,915,082 A | 6/1999 | Marshall et al. | |
| 5,949,685 A | 9/1999 | Greenwood et al. | |
| 6,058,491 A | 5/2000 | Bossen et al. | |
| 6,065,135 A | 5/2000 | Marshall et al. | |
| 6,115,829 A | 9/2000 | Slegel et al. | |
| 6,134,673 A | 10/2000 | Chrabaszcz | |
| 6,141,770 A | 10/2000 | Fuchs et al. | |
| 6,163,480 A | 12/2000 | Hess et al. | |
| 6,185,695 B1 | 2/2001 | Murphy et al. | |
| 6,189,112 B1 | 2/2001 | Slegel et al. | |
| 6,279,119 B1 | 8/2001 | Bissett et al. | |
| 6,330,689 B1 * | 12/2001 | Jin et al. | 714/15 |
| 6,367,031 B1 | 4/2002 | Yount | |
| 6,393,582 B1 | 5/2002 | Klecka et al. | |
| 6,467,003 B1 | 10/2002 | Doerenberg et al. | |
| 6,550,017 B1 * | 4/2003 | Moiin et al. | 714/4.4 |
| 6,560,617 B1 | 5/2003 | Winger et al. | |
| 6,574,748 B1 | 6/2003 | Andress et al. | |
| 6,600,963 B1 | 7/2003 | Loise et al. | |
| 6,625,749 B1 | 9/2003 | Quach | |
| 6,631,477 B1 * | 10/2003 | LeCrone et al. | 714/5.11 |
| 6,748,554 B2 * | 6/2004 | Jin et al. | 714/15 |
| 6,751,749 B2 | 6/2004 | Hofstee et al. | |
| 6,772,368 B2 | 8/2004 | Dhong et al. | |
| 6,789,214 B1 | 9/2004 | De Monis-Hamelin et al. | |
| 6,813,527 B2 * | 11/2004 | Hess | 700/82 |
| 6,990,320 B2 | 1/2006 | LeCren | |
| 7,003,688 B1 | 2/2006 | Pittelkow et al. | |
| 7,062,676 B2 | 6/2006 | Shinohara et al. | |
| 7,065,672 B2 | 6/2006 | Long et al. | |
| 7,178,050 B2 | 2/2007 | Fung et al. | |
| 7,266,719 B1 * | 9/2007 | LeCrone et al. | 714/5.11 |
| 7,320,088 B1 | 1/2008 | Gawali | |
| 7,334,154 B2 | 2/2008 | Lorch et al. | |
| 7,401,254 B2 | 7/2008 | Davies | |
| 2001/0025338 A1 | 9/2001 | Zumkehr | |
| 2002/0099753 A1 | 7/2002 | Hardin et al. | |
| 2002/0144177 A1 | 10/2002 | Kondo et al. | |
| 2003/0028821 A1 * | 2/2003 | Jin et al. | 714/15 |
| 2003/0126498 A1 | 7/2003 | Bigbee et al. | |
| 2003/0177411 A1 | 9/2003 | Dinker et al. | |
| 2003/0208704 A1 | 11/2003 | Bartels et al. | |
| 2004/0019771 A1 | 1/2004 | Quach | |
| 2004/0098140 A1 * | 5/2004 | Hess | 700/3 |
| 2004/0172574 A1 * | 9/2004 | Wing et al. | 714/4 |
| 2004/0221193 A1 | 11/2004 | Armstrong et al. | |
| 2005/0022048 A1 | 1/2005 | Crouch | |
| 2005/0138485 A1 | 6/2005 | Osecky et al. | |
| 2005/0138517 A1 | 6/2005 | Monitzer | |
| 2006/0015665 A1 * | 1/2006 | Illowsky et al. | 710/100 |
| 2006/0015936 A1 * | 1/2006 | Illowsky et al. | 726/18 |
| 2006/0015937 A1 * | 1/2006 | Illowsky et al. | 726/18 |
| 2006/0020912 A1 * | 1/2006 | Illowsky et al. | 717/103 |
| 2006/0026305 A1 * | 2/2006 | Illowsky et al. | 710/8 |
| 2006/0026588 A1 * | 2/2006 | Illowsky et al. | 717/171 |
| 2006/0041776 A1 | 2/2006 | Agrawal et al. | |
| 2006/0075300 A1 * | 4/2006 | Mukherjee | 714/38 |
| 2006/0085669 A1 | 4/2006 | Rostron et al. | |
| 2006/0206882 A1 * | 9/2006 | Illowsky et al. | 717/144 |
| 2008/0016386 A1 | 1/2008 | Dror et al. | |

FOREIGN PATENT DOCUMENTS

| | | |
|---|---|---|
| EP | 0754990 | 1/1997 |
| EP | 1014237 A1 | 6/2000 |

OTHER PUBLICATIONS

Racine, "Design of a Fault-Tolerant Parallel Processor", 2002, pp. 13.D.2-1-13.D.2-10, Publisher: IEEE, Published in: US.

Dolezal, "Resource Sharing in a Complex Fault-Tolerant System", 1988, pp. 129-169, Publisher: IEEE.

Ku, "Systematic Design of Fault-Tolerant Multiprocessors with Shared Buses", "IEEE Transactions on Computers", Apr. 1997, pp. 439-455, vol. 46, No. 4, Publisher: IEEE.

* cited by examiner

METHOD AND SYSTEM FOR REDUNDANCY MANAGEMENT OF DISTRIBUTED AND RECOVERABLE DIGITAL CONTROL SYSTEM

This application claims the benefit of priority to U.S. Provisional Application No. 60/705,843, filed on Aug. 5, 2005, which is incorporated herein by reference. The present application is related to U.S. patent application Ser. No. 11/381,608, filed May 4, 2006, and to U.S. patent application Ser. No. 11/381,637, filed May 4, 2006, both of which are incorporated herein by reference.

The U.S. Government may have certain rights in the present invention as provided for by the terms of Contract No. CRA NCC-1-393 with NASA.

BACKGROUND TECHNOLOGY

Computers have been used in digital control systems in a variety of applications, such as in industrial, aerospace, medical, scientific research, and other fields. In such control systems, it is important to maintain the integrity of the data produced by a computer. In conventional control systems, a computing unit for a plant is typically designed such that the resulting closed loop system exhibits stability, low-frequency command tracking, low-frequency disturbance rejection, and high-frequency noise attenuation. The "plant" can be any object, process, or other parameter capable of being controlled, such as an aircraft, spacecraft, medical equipment, electrical power generation, industrial automation, valve, boiler, actuator, or other device. A control effector is used to provoke a response by the plant. For example, when the plant is an aircraft, control effectors may be in the form of flight control surfaces such as rudders, ailerons, and/or elevators.

Various types of failures or faults may be encountered by conventional computing units found in control systems. A "hard fault" is a fault condition typically caused by a permanent failure of the analog or digital circuitry. For digital circuitry, a "soft fault" is typically caused by transient phenomena that may affect some digital circuit computing elements resulting in computation disruption, but does not permanently damage or alter the subsequent operation of the circuitry.

Soft faults may be caused by electromagnetic fields created by high-frequency signals propagating through the computing system. Soft faults may also result from spurious intense electromagnetic signals, such as those caused by lightning that induce electrical transients on system lines and data buses which propagate to internal digital circuitry setting latches into erroneous states. In addition to lightning, other elements of the electromagnetic environment (EME) such as high-intensity radiated fields (HIRF), radio communications, radar pulses, and the intense fields associated with electromagnetic pulses (EMP) may also cause soft faults. Further, high-energy atomic particles from a variety of sources (e.g., atmospheric neutrons, cosmic radiation, weapon detonation, etc.) may deposit sufficient energy in the bulk semiconductor material of a digital device to set electronic circuits into erroneous states. With the advent of smaller integrated circuits running at high speeds, soft faults are becoming more common such as in the radiation environment encountered by aircraft traveling at high altitudes. In such an environment, computing circuits containing state-of-the-art digital devices may be more susceptible to failure.

In conventional control systems, various forms of redundancy have been used in an attempt to reduce the effects of faults in critical systems. Multiple processing units, for example, may be used within a computing system. In a system with three processing units, for example, if one processor is determined to be experiencing a fault, that processor may be isolated and/or shut down. The fault may be corrected by correct data (such as the current values of various control state variables) being transmitted (or "transfused") from the remaining processors to the isolated unit. If the faults in the isolated unit are corrected, the processing unit may be re-introduced to the computing system along with the other two processing units.

Dissimilar computational redundancy is used to prevent the introduction of generic faults in control system architectures. Generic faults refer to common errors in system redundancies. Such errors can occur in the design and development of the hardware and software elements within general purpose computers that are used in control system architectures. As such, dissimilar computational redundancy would entail each redundant hardware element using a dissimilar microprocessor and each redundant microprocessor executing software (e.g., operating system, application, etc.) that was developed using a different programming language.

Other methods that have been used to help ensure the continued operation of control systems include the use of dissimilar technology, distributed computation redundancy, equalization, and mid-value voting. Each of these methods, however, generally requires at least one processing unit to remain operational at all times to preserve state variables. While the control systems may remain operational if all but one of the processing units experience a soft fault and the correctly-operating unit can be identified, the control system will not operate properly if all of the processors simultaneously experience soft faults. Similarly, if a lone properly-operating unit cannot be identified within the system, the system will not recover, as there would be no identifiable operating unit with correct values for all of the state variables to be transfused to the remaining units. In addition, because of the transfusion of state variables from other processing units, the system recovery may be relatively slow. It may therefore take an extended period of time for all processing units within the system to resume normal operation. In the meantime, redundant control is undesirably lost or degraded.

In the aerospace field, digital flight control systems are frequently interposed between the pilot and the flight control surfaces of an aircraft. Such systems may include fly-by-wire, auto-pilot, and auto-land systems. In a fly-by-wire system, in lieu of pilot controls being mechanically coupled (e.g., via cables or hydraulics) to the various primary flight control surfaces of the aircraft (such as the ailerons, elevators, and rudder), the position and movements of a pilot's controls are electronically read by sensors and transmitted to a computing system. The computing system typically sends electronic control signals to actuators of various types that are coupled to the primary flight control surfaces of the aircraft. The actuators are typically configured to move one or more control surfaces according to inputs provided by the pilot, or in response to feedback measured by a sensor on the aircraft. Failure of the control system could thus have catastrophic effects on the aircraft. Similarly, industrial, medical, or other systems may be gravely affected by certain control system failures.

In conventional flight control system (FCS) architectures, recovery from soft faults of FCS architectural elements, particularly in the flight control computer, is either not possible, has to resort to recovery attempts after a grace period of time, or requires recycling of power such as rebooting the computer. Any of these circumstances can impact the mean time between unscheduled removals (MTBUR) negatively. In addition, tight tolerance monitoring has been dependant on synchronous operations for tight tracking of redundant elements, and has been relatively federated and not easily scaleable.

High integrity digital flight control systems usually require incorporation of redundant elements to achieve required reliability. Management of systems to provide maximum theoretically possible availability of the redundant elements in the presence of soft faults is difficult to achieve without requiring close synchronization of the computing elements or other technically difficult monitoring mechanisms.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
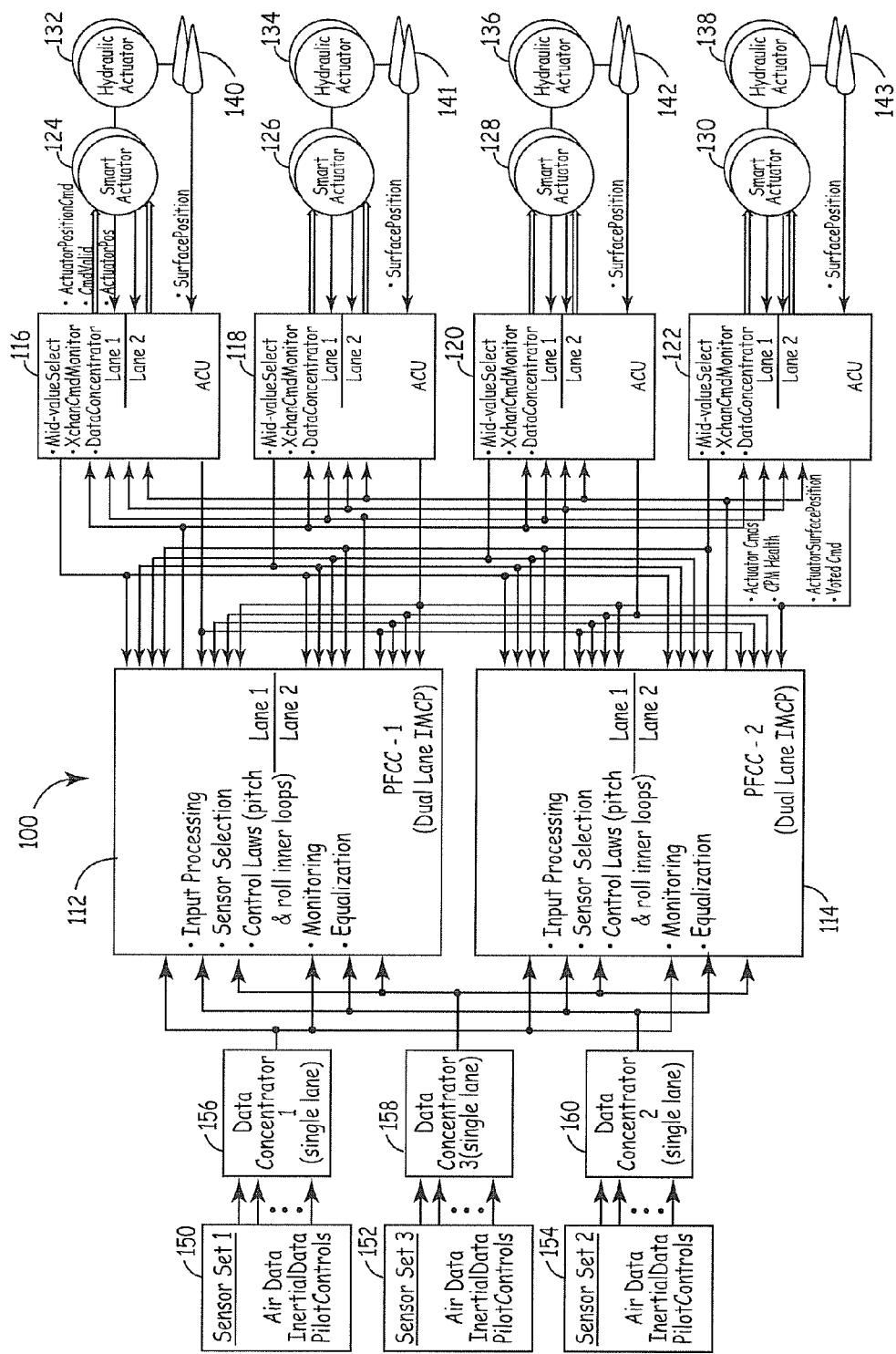
FIG. 1 is a schematic depiction of a digital control system that can employ the redundancy management features of the invention.

The present invention relates to a method and system for redundancy management of a distributed and recoverable digital control system. This invention uses unique redundancy management techniques to achieve recovery and restoration of redundant elements to full operation in an asynchronous environment. Utilizing recoverable computing elements and redundancy management that accommodates recovery of redundant elements ensures maximum availability of system resources in the presence of soft faults. The redundancy management functions are distributed throughout the architecture of the control system.

In the following description, various embodiments of the present invention may be described herein in terms of various architecture elements and processing steps. It should be appreciated that such elements may be realized by any number of hardware or structural components configured to perform specified operations. For purposes of illustration only, exemplary embodiments of the present invention will frequently be described herein in connection with aircraft avionics. The invention is not so limited, however, and the concepts and devices disclosed herein may be used in any control environment. Further, it should be noted that although various components may be coupled or connected to other components within exemplary system architectures, such connections and couplings can be realized by direct connection between components, or by connection though other components and devices located therebetween. The following detailed description is, therefore, not to be taken in a limiting sense.

According to various exemplary embodiments of the invention, a control system architecture suitably includes sufficient computation redundancy and control command management to either isolate and recover a faulted processor, or to recover all processing units of the redundant system without adverse effects. Computational redundancy may be provided with multiple processors or processing units within a computer or computing platform. In addition to isolating and recovering from internal faults, various embodiments allow processing units to detect faults in other system elements such as sensors, adaptors, actuators and/or effectors. Further embodiments may also include one or more actuator adaptor units, that through the detection of adverse data errors, detect faults in other system components (that are in addition to the processing units) and issue discrete instructions to trigger a recovery.

An exemplary control system architecture suitably includes multiple processors, each of which is configured for rapid recovery from various faults. The term "rapid recovery" indicates that recovery may occur in a very short amount of time. To maintain the operation of a control system, it is generally desirable that a recovery from a soft fault takes place within about 1 to 2 computing frames. As used herein, a "computing frame" is the time needed for a particular processing unit to perform a repetitive task of a computation, e.g., the tasks that need to be calculated continuously to maintain the operation of the controlled plant. In some embodiments, processor recovery is performed within about 1 computing frame and redundancy recovery is performed within about 1 or 2 computing frames, or otherwise in a short enough time period so as to have only minimal effects, if any, on system performance.

The ability of a processor to initiate recovery from a soft fault allows various embodiments of the present invention to aid in the recovery of the system as a whole. In addition, soft faults may be detected in the same computing frame or within several frames in which the faults occur. In embodiments wherein faults are detected within a single computing frame, each processor need only store control and logic state variable data for the immediately preceding frame for use in recovery purposes, which may take place essentially instantaneously. Accordingly, the dependence of each component upon other redundant components is suitably reduced.

Instructions for carrying out the various methods, process tasks, calculations, control functions, and the generation of signals and other data used in the operation of the system of the invention are implemented, in some embodiments, in software programs, firmware, or computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

By way of example, and not limitation, such computer readable media can include floppy disks, hard disks, ROM, flash memory ROM, nonvolatile ROM, EEPROM, RAM, CD-ROM, DVD-ROM, or other optical disk storage, magnetic disk storage, or other magnetic storage devices, or any other medium that can be used to carry or store desired program code means in the form of computer executable instructions or data structures. When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media. Computer executable instructions comprise, for example, instructions and data which cause a general purpose computer, special purpose computer, or special purpose processing device to perform a certain function or group of functions.

The system of the invention will also be described in the general context of computer readable instructions, such as program modules, being executed by a processor. Generally, program modules include routines, programs, objects, data components, data structures, algorithms, etc. that perform particular tasks or implement particular abstract data types. Computer executable instructions, associated data structures, and program modules represent examples of a program code means for executing steps of the methods disclosed herein. The particular sequence of such executable instructions or associated data structures represents examples of corresponding acts for implementing the functions described in such steps.

In one embodiment, the present invention provides a redundancy management method for the architectural elements of a control system such as a primary flight control system where some elements can rapidly recover from soft faults. This method manages redundant commands, responses, and recoveries; uses the status from independent hardware monitors internal and external to a computing unit such as a flight control computer (FCC); and uses command blending and equalization provided by complementary architecture elements comprised of high-integrity self-checking pairs of computing lanes within each computing unit and an actuator control unit (ACU). The ACU may by implemented in hardware or software or a combination of both. The ACU performs fault isolation by comparing the commands to the blended value from all inputs. The equalization makes it possible to hold the comparison to a tight threshold in the monitor. The ACU isolates the faulted output and can command recovery of a computing lane from a soft fault. Recovery can also be commanded by a computing unit of the control system based on a failure of a computing unit internal monitor.

Referring now to FIG. 1, an exemplary scaleable architecture of a digital control system 100 that can employ the redundancy management functions of the invention includes a first computing unit 112 and a second computing unit 114. The computing units 112 and 114 can be any digital control device such as a digital computer or processor, and provide for redundancy in processing. Each computing unit 112, 114 suitably includes one or more processing devices capable of executing multiple and/or simultaneous software processes. As shown, the computing units 112 and 114 can include real-time multi-tasking computing platforms such as a primary flight control computer (PFCC). The PFCC can be an integrated modular computing platform (IMCP) with dual computing lanes.

The computing units 112 and 114 provide input processing, sensor selection, control laws (e.g., pitch, yaw, and roll inner loops), monitoring (e.g., actuator and effector monitoring), equalization, rapid recovery, redundancy management, and any appropriate recovery triggers. Although control system 100 is shown with two computing units, additional computing units can be employed if desired.

Each of the computing units 112 and 114 are in operative communication with a multitude of actuator control units (ACUs) 116, 118, 120, and 122, which provide for actuator command (Cmd) management and have dual computing lanes. The ACUs perform command blending and selection, and use other redundant actuator command values while a computing platform such as a PFCC lane is recovering. The ACUs also perform monitoring of actuator command lanes, data concentration, and initiation of a selective and isolated recovery trigger of each monitored application. The ACUs can also be redundant per control axis. Although control system 100 is shown with four ACUs, a varying number of ACUs can be employed depending upon system requirements. For example, in some embodiments three or more ACUs can be employed in a control system according to the invention.

Each ACU 116, 118, 120, and 122 is also in operative communication with a respective one of a smart actuator 124, 126, 128, and 130. An actuator is made "smart" when an electronics module such as an electronic interface unit (EIU) is added to the basic actuator. The smart actuators used in the control system can be dual-channel, fail-passive, electromechanical actuators, which contain two independent computational lanes. The smart actuators receive actuator position command signals from the ACUs. The smart actuators also determine validity of commands from the computing unit based on command validity flags and activity monitoring. The smart actuators 124, 126, 128, and 130 are configured to provide feedback to the respective ACU 116, 118, 120, and 122 related to actuator position information.

The smart actuators 124, 126, 128, and 130 can optionally be in operative communication with a respective servo or actuator device such as hydraulic actuators 132, 134, 136, and 138. The hydraulic actuators 132, 134, 136, and 138 can be respectively coupled to various control effectors 140, 141, 142, and 143 such as, for example, various primary flight control surfaces of an aircraft (e.g., rudders, ailerons, and/or elevators). The control effectors 140-143 are configured to provide feedback to the respective ACU 116, 118, 120, and 122 related to effector position information.

As depicted in FIG. 1, the computing units 112 and 114 receive data inputs from sensor sets 150, 152, and 154, which can include air data, inertial data, or commands from an operator (e.g., pilot controls, etc.). The sensor sets can include any number of gyroscopes, vehicle position sensors, airflow sensors, temperature sensors, and/or other sensing devices as may be appropriate for the particular implementation. A data concentrator 156, 158, and 160 with a single lane can be implemented between each sensor set 150, 152, 154 and computing units 112 and 114. The data concentrators suitably receive and concentrate data from the sensors to provide an interface to computing units 112 and 114 as appropriate. The data concentrators may also provide sensor validity monitoring to ensure that the sensors remain active. Each of the sensors may optionally include rapid recovery elements if available and desired for the particular implementation.

The control system 100 can be suitably implemented, for example, as part of a digital flight control system to provide functions for the safe flight and landing of aerospace vehicles. The control system 100 provides for independent recovery of any computing lane, and all system elements can be executed asynchronously. Also, control system 100 can accommodate the asynchronous operation of dissimilar computational redundancy. For example, the PFCC performs equalization of surface positions by bringing diverging data back to the same value or close to the same value. An actuator command management voting algorithm accommodates asynchronous surface command inputs such that the PFCC, ACU, and other elements can execute asynchronously, and can accommodate computational lanes using dissimilar computational redundancy.

The computing platform such as the PFCC provides a real-time multi-tasking computer system with rollback recovery capability. The PFCC enables integration of functions, and applications may selectively use the recovery function as required. The recovery mechanism operation can be verifiable using common built-in-test methods, which can be used to verify operation of the recovery mechanism at any time. The PFCC can also provide monitoring of ACU surface commands and surface positions.

During operation of control system 100, computing units 112, 114 receive input from sensor sets 150, 152, 154 via data concentrators 156, 158, 160. Each computing unit provides the appropriate data to each computational lane thereof, which operate as separate partitioned processing units. Accordingly, each data set from redundant sensor and command data sets can be simultaneously processed in multiple isolated processing units. The commands signals from each lane of computing units 112, 114 propagate to each of the ACUs 116, 118, 120, and 122. The ACUs transmit the command signals to the smart actuators 124, 126, 128, and 130, which then perform the requested commands as appropriate to control the hydraulic actuators 132, 134, 136, 138, and thereby the control effectors 140-143. During normal operation, the output signals from each processing unit can be monitored internally, or externally by the ACUs, to ensure that each of the computing units 112, 114 are producing results within a predetermined tolerance of the remaining computing units.

Each processing unit of computing units 112, 114 is configured to be capable of rapid recovery from soft faults. To accomplish rapid recovery, each processing unit is configured to retrieve control and logic state variable data from internal memory locations such as a high integrity random access memory. Using the retrieved state variables and appropriate sensor data, each processing unit can fully recover from a soft fault relatively quickly without requiring a data transfusion from another computing unit. The rapid recovery cycle involves halting processor execution, instating state variables from a protected memory area, and starting execution again at an appropriate location in the program execution cycle. Through the use of command blending, equalization, or other techniques, it is not necessary to synchronize with the remaining processing units after initiating the rapid recovery cycle.

Figure 2:
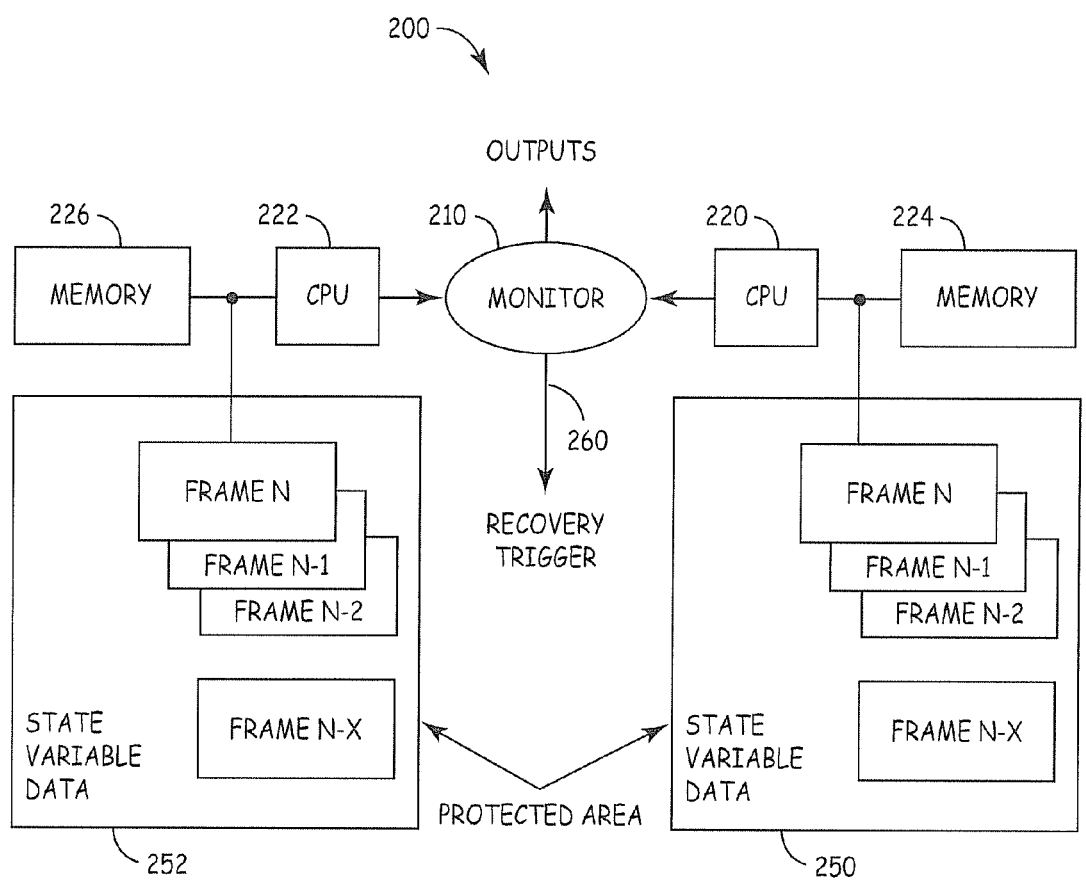
FIG. 2 is a block diagram of a soft fault rapid recovery system that can be used in the digital control system of FIG. 1.

For example, FIG. 2 is a block diagram of a soft fault rapid recovery system 200 that can be used in the digital control system of the invention. The recovery system 200 is implemented internally in each computing platform such as computing units 112 and 114 of control system 100 in FIG. 1. As shown in FIG. 2, a monitor 210 is provided that is in operative communication with a central processing unit (CPU) 220 and a CPU 222. A memory unit 224 operatively communicates with CPU 220, and another memory unit 226 operatively communicates with CPU 222. Protected storage areas can be provided to store state variable data 250, 252. The protected storage areas can include high integrity memory cells such as disclosed in U.S. Pat. No. 6,163,480, which is incorporated herein by reference.

During operation of recovery system 200, state variable data 250, 252 generated by CPU 220 and CPU 222 is stored in memory units 224 and 226, respectively. The state variable data is related to the state the CPU operates under for a given set of inputs and outputs. This data includes states generated by the computing hardware as well as states generated by the application software. The data is stored with respect to a given computing frame N several frames back in time (N−1, N−2, . . . N−X) in the protected storage areas. If the CPU or a memory element is upset to generate a soft fault, such as by interference from an EME signal, monitor 210 rapidly detects the soft fault and causes a recovery trigger 260 to initiate. This restores the state variable data saved from one of the previous computing frames and restarts the upset CPU with the most recent good data at the next starting computing frame. The recovery system 200 allows the recovered CPU to start in a time frame near to the time frame of the other CPUs in the system since no reboot of the system is necessary.

A suitable related fault recovery system that can be used in the control system of the present invention is disclosed in copending U.S. patent application Ser. No. 11/058,764 filed on Feb. 16, 2005, which is incorporated herein by reference.

During a rapid recovery cycle, the tolerance used in an ACU to determine if a processing unit is operating properly may be relaxed for that particular processing unit. For example, during normal operation, there may be a predetermined tolerance, within which each of the processing units is expected to operate. If a processing unit produces values that are not within the predetermined tolerance, that processing unit may be determined to be suffering from a soft fault, and a rapid recovery cycle may be initiated. During the rapid recovery cycle, the predetermined tolerance for the affected processing unit may be initially widened and then narrowed over a predetermined time period such that further deviations are acceptable until the processing unit resumes normal operation.

Furthermore, the output of the processing unit may not be included in the derivation of the output from the ACU (e.g., computation of the mid-value) until the output comes within the relaxed tolerance. If the output comes within tolerance (indicating that the computing unit has stabilized) within a predetermined period of time, it may once again be included in the output derivation. Before the predetermined time has expired and the processing unit output has come within tolerance, requests for placing the processing unit into a rapid recovery state may be suspended or "masked" to allow the processing unit to recover. Once the processing unit has stabilized from the recovery cycle, it may be subjected to the previous tolerances. If the output does not come within tolerance within the predetermined time, another request to place the processing unit into a rapid recovery state may be issued.

In general, if the output of a recovered element falls outside of the relaxed tolerance following recovery, that computational element is kept off-line until the system is restarted (i.e., re-powered). Such a failure indicates that the recovery was unsuccessful. While rare, this provides a means for excluding a computational element that does not return to the tolerance within a specified time period. The tolerance used following recovery is tightened over a specific time period until it reaches the original tolerance.

One technique for computing the blended control output involves computing a "mid-value" in which the signals from a processing unit are used to compute a mean and/or median of all of the values produced. This mid-valve is then compared to each signal from each of the processing units in the system. If a discrepancy exists between any particular value produced by any lane and the mean and/or median of all the values (i.e., the mid-values), an error condition is detected and the appropriate processing unit is commanded to initiate a rapid recovery cycle. The discrepancy from the mid-values may be based upon any tolerance value, which can in turn be adjusted based upon desired conditions. The detection of discrepancy from a mean or median value can be processed very rapidly, thus potentially resulting in an identification of an error within one or two computational frames of the value being produced. Accordingly, differences from mid-values may be computed based upon previous mid-values (i.e., values maintained from a previous frame), or can be computed in real time as appropriate.

Alternatively, when one or more of the ACUs 116, 118, 120, 122 sense that one of the computing units 112, 114 are not supplying signals that lie within certain tolerances, the ACUs may transmit a signal to the computing unit in question to request the start of a rapid recovery cycle for a particular processing unit.

The computing units of the control system are configured to perform redundancy management actions such as equalization, in which the control signal generated by each processing unit is driven toward fine adjustments in the computed mid-value, so that the signals produced by each processing unit result in an equalized control command. Such implementations typically do not require tight synchronization between the various processing units to achieve "equalized" command values because each command signal is driven toward the other signals (i.e., toward a mid-value).

An equalization signal is derived from feedback of control effector positions and is used to cancel out drift in the surface commands, preventing divergence of computed surface commands. This allows tight monitoring and comparison of the command signals in the ACU and the rapid detection of computing element errors in time to command recovery before state variable values are permanently lost.

Use of the equalization method allows asynchronism of the control computation elements so that the implementation of the elements may be either similar or dissimilar as called for in order to meet reliability and availability requirements. For example, different types of processors may be employed in the computing units if desired. The equalization scheme also accommodates errant effector positions By implementing command blending and equalization, rapid recovery of redundant elements is provided for in a transparent, seamless way. That is, any data errors in any processing unit do not propagate through the system to adversely affect the control function. If one processing unit encounters a soft fault and proceeds to a recovery cycle, the remaining operating processing units are unaffected by the recovery cycle and the operation of the control system as a whole is unaffected.

Figure 3:
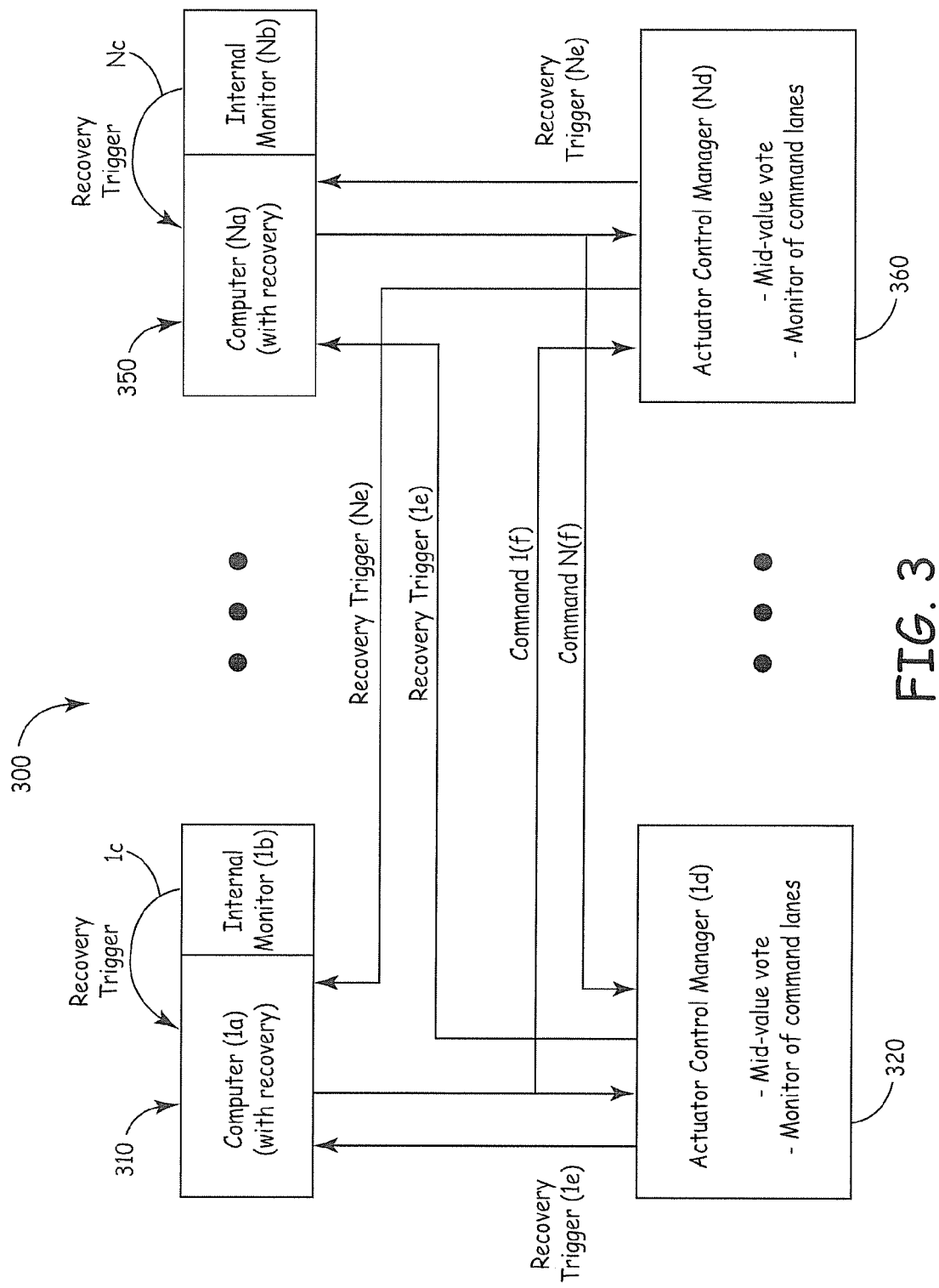
FIG. 3 is a block diagram of a command and recovery management system that can be used in the digital control system of FIG. 1.

FIG. 3 is a block diagram of a command and recovery management system 300 that illustrates a portion of the redundancy management system of the invention used with a digital control system. As shown, management system 300 is scalable to any number of redundant computing units with internal monitors that operatively communicate with a respective actuator control manager of an ACU that provides an external monitor for the computing units. This allows for ease in adding extra redundancy to the control system, adding extra control effectors, and adding extra control functions.

As depicted in FIG. 3, a computing unit 310 such as a PFCC includes a processor or computer 1$a$ with recovery available, and an internal monitor 1$b$ that provides a recovery trigger 1$c$ for computer 1$a$. The computing unit 310 is in operative communication with an ACU 320 having an actuator control manager 1$d$ that provides mid-value voting and monitoring of command lanes. An external recovery trigger 1$e$ is provided such that ACU 320 can initiate the recovery of computing unit 310. A redundant computing unit 350 includes a processor (Na) and an internal monitor (Nb) that provides a recovery trigger (Nc) for computer (Na). The computing unit 350 is in operative communication with an ACU 360 having an actuator control manager (Nd) that provides mid-value voting and monitoring of command lanes. An external recovery trigger Ne is also provided.

The computing unit 310 is also in operative communication with ACU 360, which provides a redundant external recovery trigger (Ne) to computing unit 310. Likewise, computing unit 350 is in operative communication with ACU 320, which provides a redundant external recovery trigger 1$e$ to computing unit 350. Redundancy is provided by the external recovery triggers since each of the ACUs can initiate computer recovery, because the ACUs calculate a voted value independently.

During operation of redundancy management method employed in management system 300, a command signal 1$f$ is sent from computer 1$a$ to ACU 320 and ACU 360. If either ACU detects an errant command (for instance an errant command caused by a soft fault), external recovery triggers 1$e$ or (Ne) can be initiated for computer 1$a$ recovery. Likewise, a command signal (Nf) from computer (Na) is sent to ACU 360 and ACU 320, which can initiate external recovery triggers (Ne) and 1$e$, respectively, for soft fault recovery of computer (Na). The internal monitors 1$b$ and (Nb) can also initiate recovery of computers 1$a$ and (Na) through internal recovery triggers 1$c$ and (Nc), respectively. If an ACU or the internal monitors sense a hard fault (i.e., an unrecoverable fault), then the appropriate computing unit may be shut down or isolated as appropriate.

Sensor, actuator, control effector, and time magnitude monitoring support the redundancy management method of the invention. Sensor source selection is performed based on data freshness and reasonableness monitoring. In time magnitude monitoring, an ACU blended command output is compared against the computed effector command for each control axis and deviations beyond an established limit for the specified time are reported for further redundancy management action. In this redundancy management method, the smart actuators are commanded to ignore or disregard the ACU commands when the deviations are beyond the established limit.

The actuator position feedback is also checked against a selected ACU blended command. A failure of the actuator is reported if checks of the actuator position feedback versus the ACU blended command exceeds a prescribed limit for the specified time. In this redundancy management method, actuators are commanded to restart if checks of a control effector (e.g., aileron, elevator, etc.) position feedback against the ACU blended command exceed a prescribed limit for the specified time. In this redundancy management method, the actuators are commanded to shutdown if restarting fails to correct the position error. By employing these comparison functions it is possible to determine where a fault is located.

Figure 4:
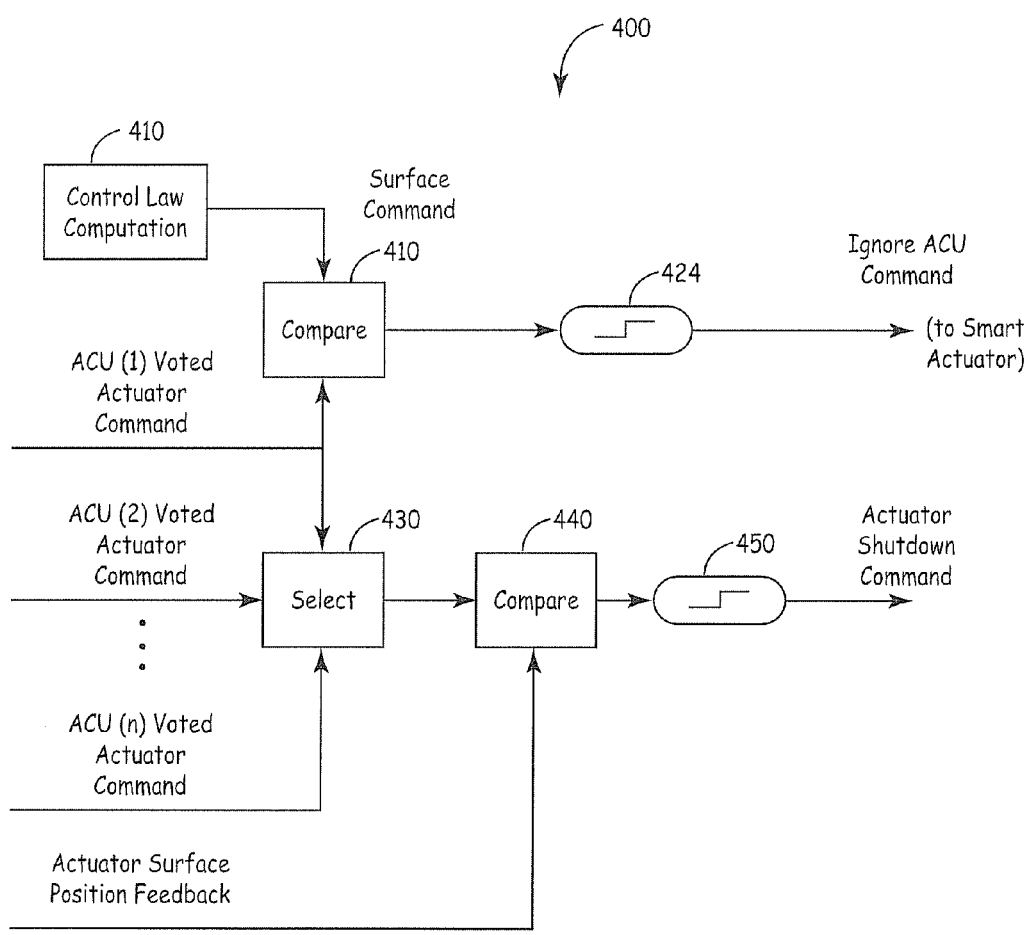
FIG. 4 is a block diagram of a time magnitude monitoring method that can be used as part of the redundancy management method of the invention.

FIG. 4 is a block diagram of an exemplary time magnitude monitoring method such as described above that can be used to support the redundancy management methodology of the invention. A processing unit of the control system performs a control law computation 410 and sends a computed surface command to a compare module 420 for comparison with an ACU(1) voted actuator command. In this redundancy management method, a smart actuator is commanded to ignore the ACU(1) voted actuator command when deviations between the ACU(1) voted command output and the computed surface command are beyond an established limit for a specified time 424. The ACU voted actuator commands for ACU(1), ACU(2) . . . ACU(n) are sent to a select module 430, and the selected command is sent to a compare module 440 for comparison with an actuator surface position feedback signal. When deviations between the selected voted actuator command output and the actuator surface position feedback signal exceed an established limit for a specified time 450, the actuator is commanded to shutdown in this redundancy management methodology.

Various redundancy management actions can be performed by an ACU, such as validating redundant control effector commands from computing units such as FCCs, performing mid-value voting of redundant control effector commands, and commanding recovery of any computing unit that exceeds an error threshold. The ACUs exclude from the voting surface commands a recovering computing unit during a specified recovery period (i.e., grace period), and permanently exclude surface commands from a computing unit that fails to recover during a specified time interval. An ACU detects attempts of other ACUs to control the same actuator, stops attempting to control the same actuator as another ACU, and attempts to establish control of an actuator that is not being driven by any other ACU. The ACU also reports actuator status to a computing unit to allow fault isolation actions by the computing unit.

Redundancy management actions are also performed by the smart actuators, such as validating all incoming ACU command messages, and positioning an output drum only in response to identical valid commands on both input channels. The smart actuators also respond to an ACU with a status message each time dual valid command messages are received, and disengage when invalid or no valid command message is received for the timeout period.

The redundancy management method and system of the invention have the following characteristics that allow rapid recovery of redundant elements of the control system. The recovery of a computational element is selective depending upon which computation is in error. Successfully recovered computational elements are allowed to be gracefully restored to the original system configuration. In order to allow an element to recover and gracefully re-enter the system, monitors (both internal and external) adjust upon detection of a recovery to not lockout an element until it has had a chance to recover. Management of redundant elements both during and after recovery of a computational element from soft faults is provided.

Hard failures are not masked by the recovery and redundancy management methods. Recovery counters and timeout monitors ensure that if recoveries are not successful, faulted elements are permanently locked out from further operation. Further, the redundancy management functions are distributed throughout the control system so that multiple elements can be in recovery at any one time.

Recovery trigger outputs are distributed among redundant elements in the control system. Multiple external recovery triggers to a computing platform element within one computational frame time are managed to initiate only a single recovery action in that element. The redundancy management system is scalable in that there is no dependency in the sorting, voting, or monitoring algorithms that would exclude a greater number of computational elements from being managed.

When the redundancy management functions are implemented as part of a digital control system used in the context of aerospace flight control, the control system performs the safety functions necessary for safe flight and landing of aircraft. The control system architecture maintains a pilot connection to control surfaces at all times such that the pilot has the last action. The recovery management provided by the control system does not compromise aircraft stability, and recovery management ensures that fault events and recoveries are transparent to aircraft function.

The control system architecture also supports multiple recoveries of redundant flight control elements from multiple monitors in real time. This is provided by using multiple redundant ACUs per control axis and multiple redundant external recovery paths. The recovery management of the control system does not compromise aircraft stability, since recovery of each computing lane occurs before an aircraft effect is produced. Even if all computing lanes needed to be recovered, such a recovery would occur before an aircraft effect would be produced. The additional layers of actuator command processing within the control system assures that no aircraft effect is produced during and after recovery. By employing recovery management of redundant elements during/after FCC recovery from soft faults, the actuator command management can use other redundant actuator command values while the FCC is recovering.

In order not to mask hard faults when soft fault recovery is part of a computing environment implementing a flight control function, some form of monitoring for number of recoveries should be provided. Along with keeping track of the number of recoveries, monitoring criteria should, at a minimum, limit the time in which some maximum number of recoveries are allowed for systems that are flight critical, particularly flight control systems. The multiple redundant elements in the control system provide hard fault management/containment. Using distributed redundancy management ensures that a recurring FCC fault is eventually treated as a hard fault since a hard fault or failure is not inadvertently masked by recovery. For example, a recovery retry counter can be used to ensure that a recurring FCC fault is eventually treated as a hard failure. The FCC will be taken off-line if excessive recovery retries occur in too short of a time.

The present invention may be embodied in other specific forms without departing from its essential characteristics. The described embodiments and methods are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for redundancy management comprising:
providing a plurality of computing units each comprising:
  a plurality of redundant processing units for generating one or more redundant control commands; and
  one or more internal monitors for detecting one or more data errors in the control commands;
providing a plurality of actuator control units having a pair of redundant computational lanes for analyzing control commands and providing feedback to the processing units; and
initiating a selective and isolated recovery of one or more monitored applications in a processing unit of the plurality of processing units while one or more other applications remain undisturbed in the processing unit when:
  one or more data errors are detected in the one or more monitored applications by one or more of the internal monitors; or
  one or more data errors are detected in the one or more monitored applications by one or more of the actuator control units;
  wherein the recovery restores the most recent error-free congruent set of state data for any one or more of the selected applications simultaneously.

2. The method of claim 1, further comprising:
computing a blended command for one or more of the control commands; and
initiating recovery in one or more of the applications when the difference between a control command generated by a processing unit and the blended command exceeds a threshold value.

3. The method of claim 2, further comprising:
excluding from the blended command a processing unit command for a recovering application for a specified recovery period;

wherein the recovering processing unit command is not permanently excluded from the blended command before the specified recovery period has expired, and wherein the recovering processing unit command is permanently excluded from the blended command when the recovering application fails to correctly recover during the specified recovery period.

4. The method of claim 2, further comprising:
analyzing the control commands generated by each of the processing units; and
adjusting the computed blended command so that the control commands generated by the processing units result in a substantially equalized control command.

5. The method of claim 1, further comprising:
comparing a blended command output with a computed command;
disregarding the blended command output when deviations between the blended command output and the computed command exceed an established limit for a specified time;
selecting a blended command output from a plurality of blended command outputs;
comparing the selected blended command output with an actuator position feedback signal; and
initiating an actuator shutdown command when deviations between the selected blended command output and the actuator position feedback signal exceed an established limit for a specified time.

6. The method of claim 1, wherein the method is implemented in redundancy management of a recoverable digital control system.

7. The method of claim 1, wherein the method is implemented in redundancy management of a computing platform.

8. The method of claim 1, wherein the method is implemented in redundancy management of one or more actuator control units.

9. The method of claim 1, wherein the method is implemented in redundancy management of one or more smart actuators.

10. The method of claim 1, wherein the method provides coordinated redundant control of actuators by the actuator control units.

11. The method of claim 1, wherein the method validates and responds to each valid command from the actuator control units, and safely disengages an actuator when no valid command is received during an established limit for a specified time.

12. The method of claim 6, wherein redundancy management actions are distributed throughout the system so that multiple elements of the system can be in a recovery state at any one time.

13. The method of claim 1, wherein redundancy management actions support multiple recoveries of redundant elements from multiple monitors in real time.

14. The method of claim 1, further comprising duplicating state variable data stored in one or more memory devices in the computing units.

15. The method of claim 6, further comprising restoring a duplicate set of state variable data when a soft fault is detected so that one or more processing units can resume processing using the duplicate set of state variable data.

16. The method of claim 10, wherein at least one of the actuator control units detects attempts of other actuator control units to control the same actuator, and stops attempting to control the same actuator as another actuator control unit, while attempting to establish control of an actuator that is not being driven by any other actuator control unit.

17. The method of claim 10, wherein at least one of the actuator control units reports actuator status to a computing unit to allow fault isolation actions by the computing unit.

18. A method for redundancy management comprising:
providing a plurality of computing units each comprising:
a plurality of redundant processing units for generating one or more redundant control commands; and
one or more internal monitors for detecting one or more data errors in the control commands;
wherein the processing units each include a recovery mechanism, the recovery mechanism comprising:
a duplicate memory;
an even frame memory, wherein the recovery mechanism is configured to duplicate state variables computed during even computational frames into the even frame memory; and
an odd frame memory, wherein the recovery mechanism is configured to duplicate state variables computed during odd computational frames into the odd frame memory;
wherein the even frame memory and the odd frame memory toggle back and forth duplicating state variables into the duplicate memory for computational frames in which no fault is detected;
providing a plurality of actuator control units having a pair of redundant computational lanes for analyzing control commands and providing feedback to the processing units; and
initiating a selective and isolated recovery of one or more monitored applications in a processing unit of the plurality of processing units while one or more other applications remain undisturbed in the processing unit when:
one or more data errors are detected in the one or more monitored applications by one or more of the internal monitors; or
one or more data errors are detected in the one or more monitored applications by one or more of the actuator control units;
wherein the recovery mechanism creates and restores an error-free congruent set of state data for any of the one or more monitored applications selected for recovery.

* * * * *